United States Patent [19]

Procter et al.

[11] Patent Number: 5,440,542
[45] Date of Patent: Aug. 8, 1995

[54] METHOD AND APPARATUS FOR MULTIPLEXING CONTROL INFORMATION INTO A USER SIGNAL STREAM OF A CDMA CELLULAR SYSTEM

[75] Inventors: Lee M. Procter, Elgin; Jay P. Jayapalan, Buffalo Grove, both of Ill.

[73] Assignee: Motorola, Inc., Schaumburg, Ill.

[21] Appl. No.: 114,943

[22] Filed: Oct. 14, 1993

[51] Int. Cl.⁶ .................. H04J 13/00; H04J 3/12; H04Q 7/22
[52] U.S. Cl. ..................... 370/18; 370/111; 370/112; 379/59; 379/63; 455/33.2
[58] Field of Search ............ 370/18, 95.1, 95.3, 370/110.1, 111, 118, 55, 112; 379/59, 60, 63; 455/33.1, 33.2, 54.1, 68; 375/1

[56] References Cited

U.S. PATENT DOCUMENTS

| | | | |
|---|---|---|---|
| 4,330,858 | 5/1982 | Choquet | 370/111 |
| 4,654,867 | 3/1987 | Labedz et al. | 379/59 |
| 5,182,753 | 1/1993 | Dahlin et al. | 370/110.1 |
| 5,278,892 | 1/1994 | Bolliger et al. | 379/60 |
| 5,285,199 | 2/1994 | Pocek | 370/111 |
| 5,293,377 | 3/1994 | Gould | 370/111 |

OTHER PUBLICATIONS

GSM Recommendation 08.60, Version 3.1.0, "Inband Control of Remote transcoders and Rate Adaptors", Jun. 6, 1989, pp. 1–28.

*Primary Examiner*—Hassan Kizou
*Attorney, Agent, or Firm*—Anthony G. Sitko

[57] ABSTRACT

A method and apparatus is offered of multiplexing control information into a user signal stream in a cellular communication system using code division multiple access. The method includes the steps of determining a temporal measure (101) of control information to be substituted for a corresponding measure of user information, substituting (102) the control information into the signal stream while buffering a corresponding temporal measure of user information, and resuming transmission (103) of user information beginning with the buffered user information.

5 Claims, 2 Drawing Sheets

METHOD AND APPARATUS FOR MULTIPLEXING CONTROL INFORMATION INTO A USER SIGNAL STREAM OF A CDMA CELLULAR SYSTEM

FIELD OF THE INVENTION

The field of the invention relates to communication systems and, more particularly, to a method of multiplexing control information into a user signal stream of a code division multiple access (CDMA) system.

BACKGROUND OF THE INVENTION

Cellular systems using spread spectrum encoding are known. Direct sequence code division multiple access (DS-CDMA) and frequency hopping (FH) are the two most well known of the spread spectrum technologies in which an information signal is distributed over a relatively wide spectral area for purposes of reducing the impact of interference. Frequency hopping achieves the benefits of spread spectrum transmission by hopping through a number of conventional narrowband channels, thereby reducing the average impact of interference in any one channel or group of channels.

DS-CDMA spreads an information signal over a designated spectrum by modulating the information signal with a spreading code which has properties similar to that of a random number. The spreading code used is typically the output of a pseudorandom number generator which provides a number sequence that repeats over a relatively long time interval.

At a receiver the DS-CDMA spread spectrum signal must be de-spread through use of a de-spreading code that has the same characteristics as the spreading code. De-spreading is accomplished by the correlation of the received spread signal with a synchronized replica of the spreading code used to spread the transmitted information.

The use of a spreading code that has the characteristics of a random number ensures that the transmitted signal will be randomly spread throughout a transmission spectrum. The requirement for a duplicate of the spreading code at a receiver (for de-spreading), on the other hand, requires that the spreading (and de-spreading) code be a repeating sequence known to both transmitter and receiver. The use of identical spreading and de-spreading codes at both transmitter and receiver provides the basis for communication between multiple pairs of communicating parties within the same spectrum with minimal mutual interference.

Within a CDMA cellular system, separate control channels are maintained for system access through a list of spreading codes known to both mobile communication units and base sites. Upon desiring access a communication unit transmits a request for system access. The access request may contain such control information as a user identifier and a called number. The base site may respond with control information identifying a spreading code of a traffic channel and a transmit power level.

Upon receipt of the traffic channel information, the communication unit synchronizes to the traffic channel and begins exchanging information with another user at the called number. Control information between the base site and the communication unit during maintenance of the traffic channel is exchanged through the use of "blank and burst" or "dim and burst" techniques.

During "blank and burst" or "dim and burst" an audio signal is muted or encoded at a lower bit rate, respectively, while control information is exchanged between base site and communication unit. Since the exchange of control information occurs very rapidly the disruption in audio signals between users is slight. Audio information that would have been exchanged during "blank and burst" or "dim and burst" is simply discarded. The use of variable rate vocoding and muting techniques means that this "stealing" of bits of speech is undetectable by users.

While "blank and burst" and "dim and burst" are effective during exchanges of audio information, the impact upon data exchanges is far more serious. For transparent services, data information will be lost with the sending terminal equipment being unaware of the loss and the receiving terminal equipment being unable to recover the lost data. Recovery is impossible within transparent services because, by the very nature of transparent services, no provision is made to provide for error protection and re-transmission upon the detection of errors.

For non-transparent services, the use of end-to-end protocols provides a means through which terminal equipment will be able to recover by re-transmission handshaking. The result, on the other hand, is a loss in throughput when the receiving terminal detects an error and request re-transmission of missing frames. Because of the importance of data transmission, a need exists for a means of exchanging control information between base sites and communication units in CDMA systems that does not result in a loss of user information.

DETAILED DESCRIPTION OF THE PREFERRED EMBODIMENT

Figure 1:
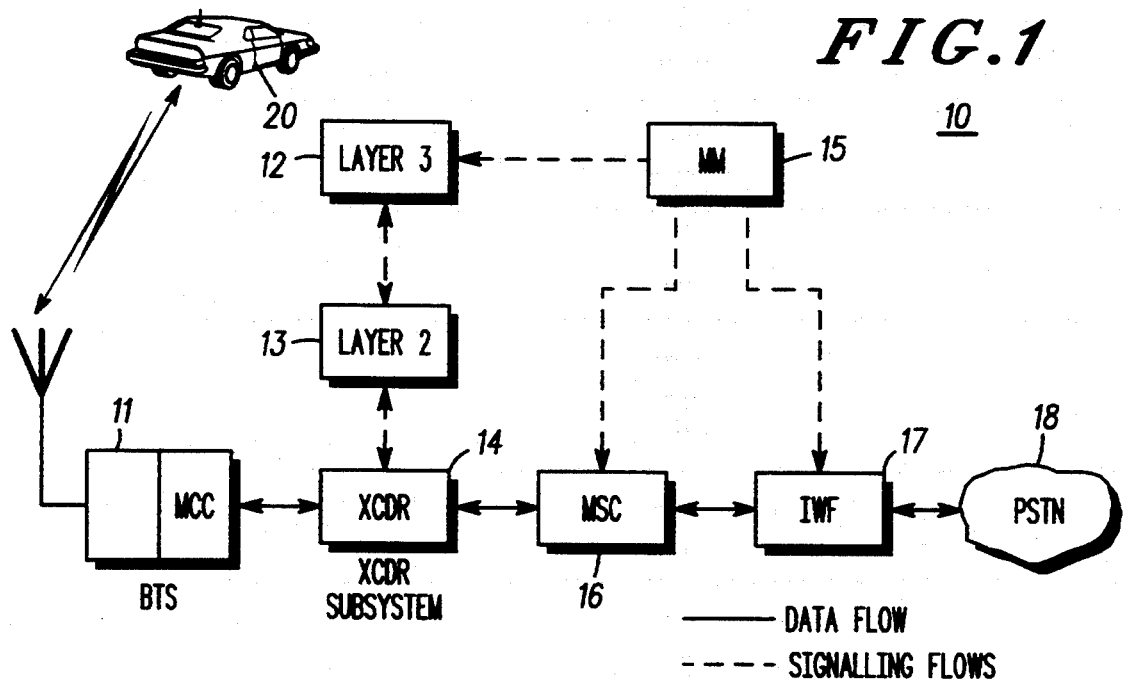
FIG. 1 comprises a block diagram of a cellular communication system in accordance with an embodiment of the invention.

The solution to the problem of data loss during control transmissions in a CDMA cellular system lies, conceptually, in the short-term buffering of user information within a transcoder of a base site controller during periods of control transmissions, and resumption of processing of buffered user data following completion of control transmission on a first-in-first-out basis. The backlog of buffered information is eliminated by communicating a request for null frames to be inserted into the signal stream to an interworking function (IWF) within the cellular infrastructure and in the substitution of buffered information for null frames.

The IWF provides flow control (IWF-to-transmitting-terminal flow control) between a public switch telephone network (PSTN) subscriber transmitting terminal and the cellular system. IWF-to-transmitting-terminal flow control is a technique used in data transmission systems as a means of matching a data transmission link to local receiving conditions. IWF-to-transmitting-terminal flow control is often used where a transmission link operates much faster than a local receiver. Under IWF-to-transmitting-terminal flow control when a buffer at a receiver is full an X-off command is sent to a transmitting terminal to halt transmission of data. As the receiving buffer empties an X-on command is sent. IWF-to-transmitting-terminal flow control operates open-loop in that no hand-shaking occurs between transmitting terminal and receiving buffer. Hand-shaking, as is known, involves the exchange of acknowledgement messages between sending and receiving terminals acknowledging such activities as data transmission, control commands, etc.

The use of IWF-to-transmitting-terminal flow control would not be effective for directly accommodating control transmissions because of the short-term nature of control transmissions and because of the open-loop nature of IWF-to-transmitting-terminal flow control. Following a determination that control information was to be transmitted and an X-off command transmitted by the IWF to a transmitting terminal, a delay would still be experienced between transmission of the X-off command and cessation of data received at the IWF. Following transmission of the control information, and transmission of the X-on command, another delay would be experienced before data reaches the IWF. Further, because of the open-loop naure of IWF-to-transmitting-terminal flow control, the transmission of additional X-on and X-off commands could result in further delays where such commands do not reach the transmitting terminal.

Inclusion of a buffer in the transcoder, on the other hand in accordance with an embodiment of the invention, allows for the transmission of control information without interrupting normal IWF functions. Where the transcoder operates at a higher processing speed than the IWF, buffering of information in the transcoder may eliminate the need for immediate IWF-to-transmitting-terminal flow control following transmission of control information. Where the transcoder operates at the same or a slower rate than the IWF, the buffering of user information in the transcoder allows for the more efficient use of IWF-to-transmitting-terminal flow control.

Figure 3:
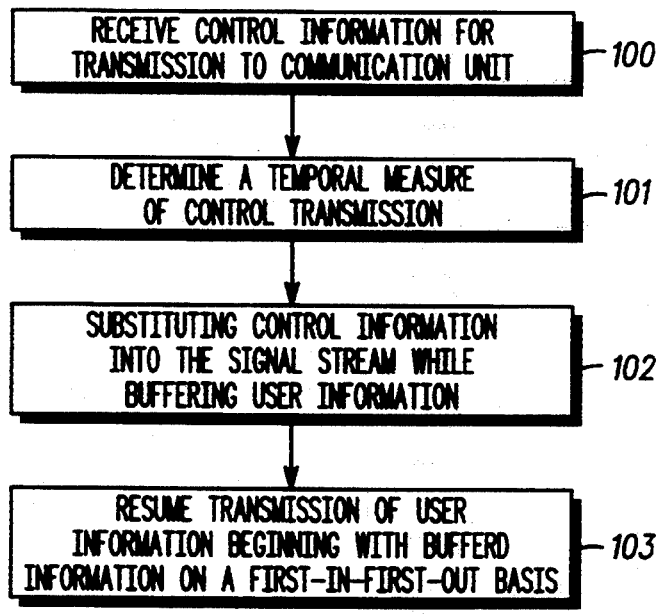
FIG. 3 is a flow chart of transcoder buffering and recovery in accordance with an embodiment of the invention.

FIG. 3 is a flow chart of transcoder buffering and recovery in accordance with an embodiment of the invention. Reference shall be made to the flow chart as appropriate in an understanding of the invention.

FIG. 1 is a block diagram of a CDMA cellular communication system 10 in accordance with an embodiment of the invention. Within such a system 10, calls received from, and directed to, a mobile communication unit 20 are exchanged through a base transceiver station (BTS) 11 and mobile channel card (MCC) within the BTS 11. A signal received from the communication unit 20 is transferred to a transcoder (XCDR) 14 for decoding. Information to be transmitted to the communication unit is first encoded within the XCDR 14 before transmission through the BTS 11.

Within the XCDR 14 control information of a received signal is stripped off and forwarded to layer 3 (12) of the cellular control system (see EIA/TIA standards IS-88, 89, and 90). Likewise, control information to be directed to the communication unit 20 passes from Layer 3 (12) for encoding within the XCDR 14 for transmission to the communication unit 20. Layer 3 (12) of the cellular system 10, as is well known to those in the art, provides call management (not shown), mobility management 15 and radio resource management (not shown). Layer 3 is responsible for allocating specific messages to the appropriate CDMA channel. The appropriate CDMA channel is accessed via Layer 2 (13) and collectively supports all signalling requirements through BTSs of a cellular system.

User information between the communication unit 20 and a target (not shown) within the public service telephone network (PSTN) 18, is transceived through the BTS 11, rate adapted in the XCDR 14, and routed through a mobile switching center (MSC) 16 for translation within an interworking function (IWF) 17. The IWF 17 acts to convert PCM voice band signals of the PSTN 18 to protocols (e.g., V.110 or V.120) used within the cellular system 10. The IWF 17 also provides IWF to transmitting terminal flow control for data transfers between the PSTN 18 and the cellular system 10.

Figure 2A:
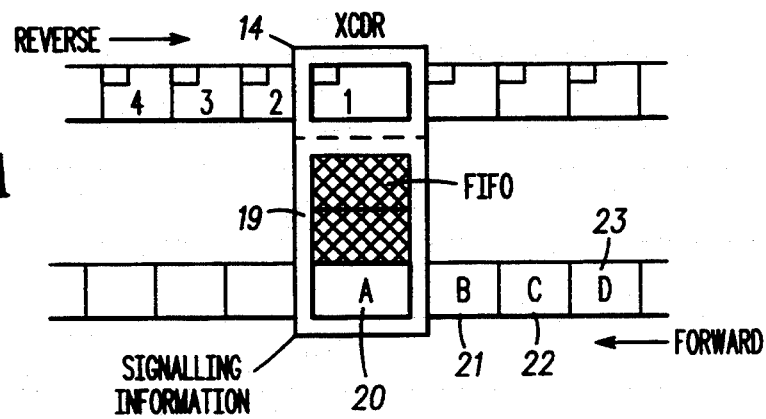
FIG. 2A through FIG. 2D depict operation of a transcoder with a buffer in accordance with an embodiment of the invention.

In accordance with an embodiment of the invention a first-in-first-out (FIFO) buffer 19 (FIG. 2A) is included within the XCDR 14. The FIFO 19 is included within the forward signal path (PSTN subscriber to mobile 20). Following call set-up, signal flow on the forward channel is as shown in FIG. 2A (forward channel signal flow is shown on the bottom of FIG. 2A as flowing from right to left). Signals entering the XCDR 14 are rate adapted and forwarded to the BTS 11 without delay. As shown (FIG. 2A) under normal operating conditions the FIFO buffer remains empty.

Figure 2B:
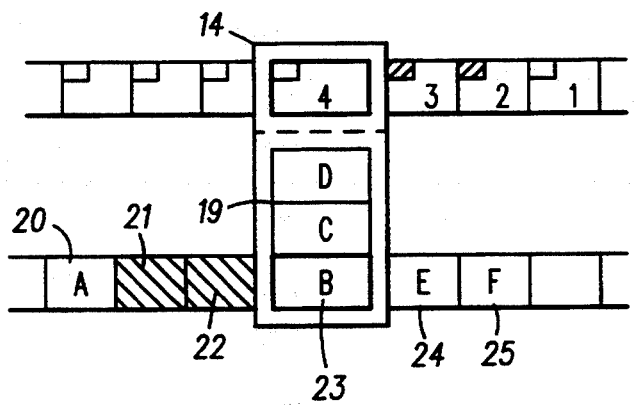

During the course of an exchange between a communication unit 20 and a PSTN subscriber, the need, upon occasion, will arise to transmit control information to the commumciation unit 20 (e.g., power adjustments). In such a case the control information is communicated from Layer 3 12 to the XCDR 14. Upon receipt 100 of the control information, the XCDR 14 first determines 101 a measure of time (temporal measure) necessary for transmission of the control information. Upon determining the time (e.g., in frames) required to transmit the information, XCDR 14 inserts 102 the information into the user signal stream while buffering an equal amount of user information (FIG. 2B). In this example there are two blocks of control information to be sent. Therefore, user information B and C contained in blocks 21 and 22 are stored in FIFO 19. The control information is then inserted in place of the user information in blocks 21 and 22. Buffered user information (blocks C and D) is shown in FIG. 2B as a vertical column within the buffer 19 with information entering, from the right, placed at the top of the column and information leaving shown at the bottom of the column.

Buffering the user information creates a small time delay within the XCDR 14 due to the buffering. As a result of the buffering and upon resumption 103 of the transmission of user information, the processed user information now passes through the FIFO buffer 19 with the additional time required for passing through the XCDR 14 equal to the time necessary for the user information to pass through the FIFO 19 (e.g., two additional frames).

Figure 2C:
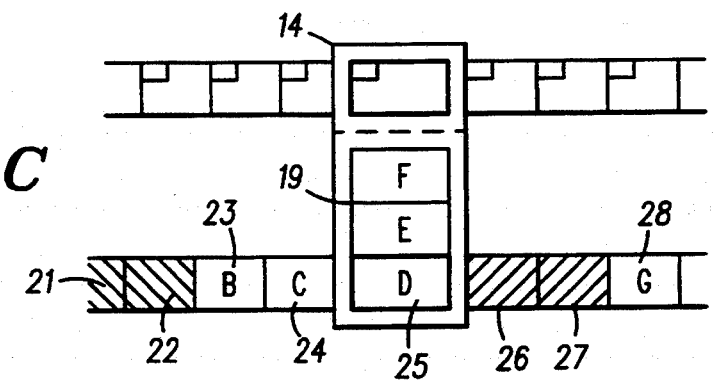

As the XCDR 14 begins substituting information into the user signal stream, XCDR 14 begins requesting null frames from the IWF 17. Under an embodiment of the invention the XCDR 14 requests null frames by setting a bit in each frame on the reverse channel (FIG. 2B), where the number of reverse frames with set bits corresponds to the requested number of null frames. The frames with set bits are shown in the reverse channel at the top of FIG. 2B with black boxes in the upper left corner of the requesting frames (e.g., blocks 2 and 3). Until the blank blocks arrive, the user information is sent in and out of FIFO 19 as shown in FIG. 2C. Here, user information D is removed from block 23 and user information B is inserted. This FIFO process continues until the arrival of the null frames.

Figure 2D:
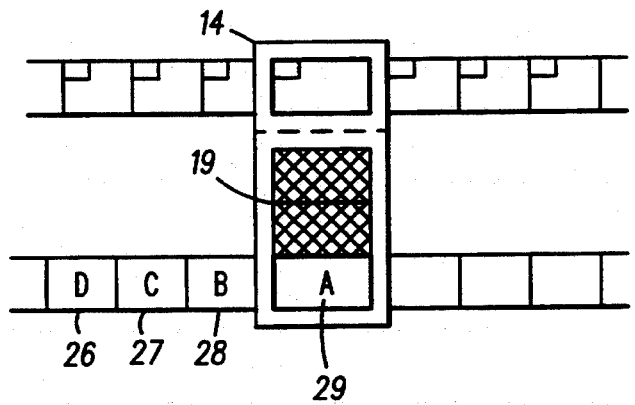

In response to the request for null frames the IWF 17 transmits the requested number of null frames (FIG 2C). As the XCDR 14 processes frames on the forward channel the XCDR 14 tests for null frames. Where the XCDR 14 detects a null frame, the XCDR 14 discards the null information and replaces the null information with buffered information (e.g., user information E and F in blocks 26 and 27). The discarding of null frames reduces the number of buffered frames within the FIFO buffer 19 until the FIFO buffer 19 is empty (FIG. 2D).

By way of example, communication unit 20 may wish to exchange data with a target (not shown). The target may be a PSTN subscriber or another communication unit in another cellular system. In support of such a transaction the communication unit 20 transmits an access request to the BTS 11. The access request is received by the BTS 11 and transferred to Layer 3 12 of the cellular control system. Upon verification of the call request, a resource allocation is forwarded from Layer 3 12 to the XCDR 14 for transmission to the requesting commuciation unit 20. Routing commands are also transmitted to the MSC 16 and IWF 17. Following channel set-up, data exchange may begin on the traffic channel. User information may flow from the target as shown in FIG. 2 and in the reverse direction (from the communication unit 20 to the target). Where the user information flows from the communication unit 20 to the target then a buffer in the forward channel would not be used (absent the forward flow of user information). Where user information in the form of data is transferred in the forward direction then such transfer concurrent with a need to transmit control information would occur as described above.

The use of the buffer in the forward direction of a cellular traffic channel, in accordance with the invention, beneficially allows for transfer of data through a serving transcoder without loss during control transmissions. The transmission of requests for null frames in the reverse direction allows the transcoder to recover from control transmissions without disruption of system operation.

The many features and advantages of this invention are apparent from the detailed specification and thus it is intended by the appended claims to cover all such features and advantages of the system which fall within the true spirit and scope of the invention. Further, since numerous modifications and changes will readily occur to those skilled in the art (e.g., use of the invention between buffers within the same cellular system), it is not desired to limit the invention to the exact construction and operation illustrated and described, and accordingly all suitable modifications and equivalents may be resorted to, falling within the scope of the invention.

It is, of course, to be understood that the present invention is, by no means, limited to the specific showing in the drawing, but also comprises any modification within the scope of the appended claims.

We claim:

1. In a base station controller of a cellular communication system using code division multiple access encoding, a method of multiplexing control information for a communication unit into a user signal stream, the method comprising the steps of: receiving at a transcoder of the base station from an interworking function of the cellular system, user information to be encoded and communicated to the communication unit in the user signal stream; receiving at the transcoder control information to be inserted in the user signal stream; determining a temporal measure of the received control information; inserting the control information into the user signal stream while buffering a corresponding temporal measure of user information; communicating the temporal measure to the interworking function by marking a corresponding temporal measure of information communicated from the transcoder to the interworking function on a reverse channel; generating, within the interworking function, a set of null characters temporally equal to the temporal measure; and substituting the buffered user information for the null characters.

2. The method of claim 1 wherein the step of communicating the temporal measure of user information to the interworking function by marking a corresponding temporal measure of information on a reverse channel comprises setting a status bit in a plurality of communication frames being communicated on the reverse channel temporally equal to the corresponding temporal measure.

3. The method of claim 2 wherein the step of generating, within the interworking function, a set of null characters temporally equal to the buffered user information comprises generating null frames in one-for-one correspondence to the plurality of communication frames having a set status bit.

4. An apparatus for multiplexing a control signal intended for a communication unit of a cellular communication system into a user signal stream at a base station controller, the apparatus comprising: a transcoder operably interconnected with the base station controller and an interworking function; a register within the transcoder for receiving the control signal from the base station controller; a first processor within the transcoder for determining a temporal length of the control signal; a second processor for inserting the control signal into the user signal stream while buffering a corresponding temporal length of user information received from the interworking function; a signal path associated with information being communicated on a reverse channel from the transcoder to the interworking function for communicating the temporal length of the buffered user information to the interworking function; a third processor within the interworking function for generating null characters within the user signal stream for a time period substantially equal to the temporal length of the buffered user information; and a fourth processor within the transcoder for substituting the buffered user information for the null characters.

5. The apparatus of claim 4 wherein the signal path comprises status bits associated with the information being communicated on the reverse channel for indicating the amount of null characters to be generated.

* * * * *